United States Patent Office 3,225,932
Patented Dec. 28, 1965

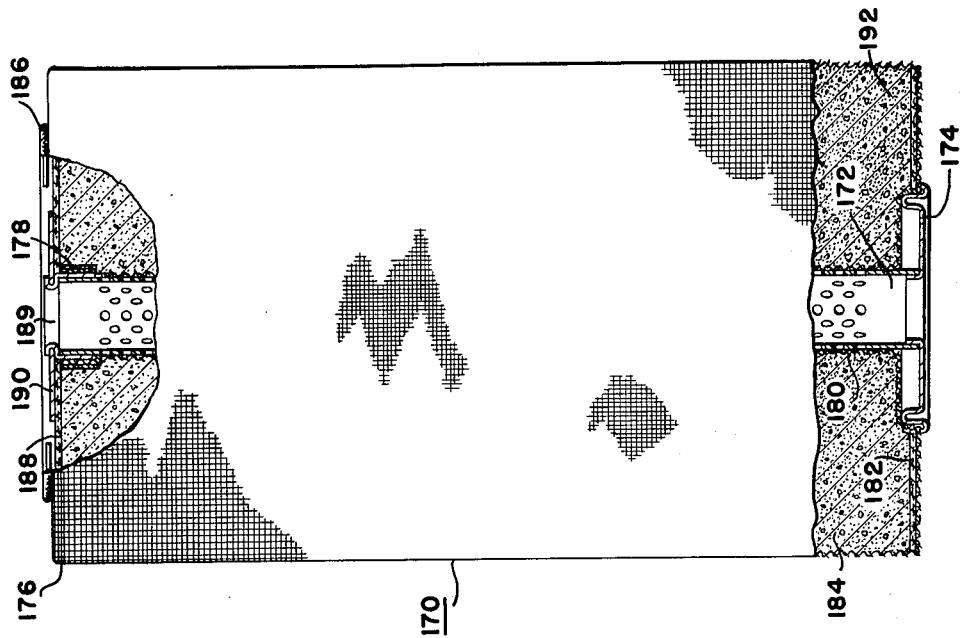

3,225,932
FILTER CARTRIDGE
Joseph B. Dunn, Vandalia, and Marvin O. Ross, Dayton, Ohio, assignors to General Motors Corporation, Detroit, Mich., a corporation of Delaware
Original application May 14, 1963, Ser. No. 280,349, now Patent No. 3,174,165, dated Mar. 23, 1965. Divided and this application Dec. 17, 1964, Ser. No. 418,973
2 Claims. (Cl. 210—282)

This is a division of application Serial No. 280,349, filed May 14, 1963, now Patent 3,174,165, granted Mar. 23, 1965.

This invention relates to dry cleaning apparatus of the replaceable filter cartridge type.

Recently, self-service dry cleaning systems have become popular and have placed the advantages of dry cleaning within the economic reach of everyone. One such dry cleaning system utilizes a replaceable filter cartridge in its solvent circulation system, said cartridge being periodically replaceable in order to maintain the solvent in the best condition. This filter cartridge combines a folded paper element in combination with granular carbon in a cylindrical perforated canister and is designed to provide filtration for approximately 100 dry cleaning cycles before it needs replacing. Toward the end of the cartridge life, the carbon phase of the cartridge becomes less effective and the circulating solvent tends to darken as more of the dyes bled from fabric during the cleaning thereof are retained in the solvent. The use of such dye-tainted solvent causes light fabric to yellow due to a redepositing onto the fabric of dye components in the solvent. Accordingly, an object of this invention is directed to a cartridge for conditioning solvent in a dry cleaner of the type using a replaceable filter cartridge, said cartridge insuring a complete adsorption of dye from the solvent.

Further objects and advantages of the present invention will be apparent from the following description, reference being had to the accompanying drawings wherein a preferred embodiment of the present invention is clearly shown.

In the drawing:

The sole figure is an elevational view, partly in section, of the adsorbing cartridge of this invention.

The successful operation of a replaceable cartridge dry cleaning apparatus depends on the efficiency with which solvent is handled and conditioned in the system. In this apparatus, a filtering and adsorbing cartridge is utilized which is replaceable after a period of usage. With a filtering and adsorbing cartridge solvent will tend to discolor after a period of time even though the particulate contaminants are still being effectively removed by the cartridge. It frequently occurs that the dye removing or adsorbing capability of the cartridge is exhausted before the filtering capability thereof. Thus dyes tend to build up in the solvent until the solvent color changes to a dark amber. When this happens, some of the dyes will redeposit on the fabrics being cleaned and cause a yellowing effect which is particularly noticeable on light colored fabrics. To overcome this dye build-up in the solvent, an adsorbing cartridge 170 is used interchangeably with a filtering and adsorbing cartridge.

For additional details on the construction of the replaceable filtering and adsorbing cartridge, reference may be had to the copending application Ser. No. 210,651, filed July 18, 1962, now Patent 3,189,179, granted June 15, 1965, and assigned to the same assignee as this application.

The adsorbing cartridge 170 is constructed with a perforated metallic center outlet tube 172 attached as by welding to a paint can lid 174 to form a subassembly. A perforated or woven fabric bag 176 includes an inner return fold portion 180 having its tubular end affixed by a wrapping of tape 178 at one end of the perforated outlet tube 172. The inner portion 180 of the bag hugs the radially outer side of the center tube 172 to form a protective shield which prevents carbon migration into the outlet tube 172. An annular fiberboard or cardboard washer 182 supports the outer wall 184 of the bag in a manner to space it from the inner wall 180, thereby forming a cavity therebetween—the paint can lid 174 press fitting into the washer 182 to retain the fabric and to hold the bottom of the adsorbing cartridge in proper shape. The upper end of the bag outer wall 184 has a draw string 186 which, after the cavity is filled with approximately eight pounds of granular carbon 192, is drawn tightly around an annular fiberboard or cardboard washer 188 at the top of the cartridge. The washer 188 rests on a shoulder of a metal ferrule 189 affixed to the top of the perforated tube 172. When the end of the ferrule is spun over a metal washer 190, the container assembly of the adsorbing cartridge is completed. So that the outer surface of the cartridge 170 remains cylindrical, the bag, paint can lid and center tube sub-assembly may be placed in a cylindrical fixture while the cavity is being filled with carbon.

While the embodiment of the present invention as herein disclosed constitutes a preferred form, it is to be understood that other forms might be adapted.

What is claimed is as follows:

1. A disposable cartridge for use with dry cleaning solvent such as perchlorethylene to condition the solvent by controlling the color thereof and comprising:

a fabric bag having an outer portion adapted to receive through the perforations thereof solvent to be conditioned, a perforated center tube concentric with said outer portion and having one end open for dispensing condition solvent therethrough, an annular imperforate lower end plate at the lower end of said cartridge supporting said outer portion a spaced distance from said center tube to define an annular solvent conditioning chamber, a lower cover having solvent outlet means in communication with said one end of said center tube, said one end of said center tube, said center tube being fastened at said one end to said lower cover in a manner to support said center tube generally perpendicular thereto, said fabric bag having an inner portion enveloping said center tube and an intermediate portion in juxtaposition to the inside of said lower cover and the outside of said lower end plate, said fabric bag, said lower end plate, said center tube and said lower cover forming a lower cover and center tube assembly, said lower cover having a yieldable press-fit edge frictionally engaging the intermediate portion of said fabric bag along the inner peripheral edge of said lower end plate for partially closing the lower end of said chamber and for supporting said center tube in said chamber, activated carbon granules in said chamber for removing non-particulate matter from solvent flowing therethrough to control the color thereof, and means at the upper end of said cartridge for sealing said carbon granules in said chamber.

2. A disposable cartridge for use with dry cleaning solvent such as perchlorethylene to condition the solvent by controlling the color thereof and comprising:

a fabric bag having an outer portion adapted to receive through the perforations thereof solvent to be conditioned, a perforated center tube concentric with said outer portion and having one end open for dispensing conditioned solvent therethrough, an annular imperforate lower end plate at the lower end of said cartridge supporting said outer portion a spaced distance from said center tube to define an annular solvent conditioning chamber, a lower cover having solvent outlet means in communication with said one end of said center tube, said center tube being fastened at said one end to said lower cover in a manner to support said center tube generally perpendicular thereto, said fabric bag having an inner portion enveloping said center tube and an intermediate portion in juxtaposition to the inside of said lower cover and the outside of said lower end plate, said fabric bag, said lower end plate, said center tube and said lower cover forming a lower cover and center tube assembly, said lower cover having a yieldable press-fit edge frictionally engaging the intermediate portion of said fabric bag along the inner peripheral edge of said lower end plate for partially closing the lower end of said chamber and for supporting said center tube in said chamber, activated carbon granules in said chamber for removing non-particulate matter from solvent flowing therethrough to control the color thereof, and means at the upper end of said cartridge for sealing carbon granules in said chamber, said means for sealing including an annular imperforate upper end plate supporting said outer portion a spaced distance from said center tube at the upper end thereof and for closing the upper end of said chamber, and a drawstring in said fabric bag at one of said outer portion for locking said fabric bag to said upper end plate.

References Cited by the Examiner

UNITED STATES PATENTS 3,076,553  2/1963  Yelinek _____ 210—484 X
3,189,179  6/1965  McMichael _____ 210—315 X REUBEN FRIEDMAN, *Primary Examiner.*

S. ZAHARNA, *Assistant Examiner.*